United States Patent
Shibuya

(10) Patent No.: US 6,509,991 B1
(45) Date of Patent: Jan. 21, 2003

(54) INFRARED COMMUNICATOR

(75) Inventor: Toshiyuki Shibuya, Tokyo (JP)

(73) Assignee: NEC Corporation (JP)

( * ) Notice: Subject to any disclaimer, the term of this patent is extended or adjusted under 35 U.S.C. 154(b) by 0 days.

(21) Appl. No.: 09/196,285

(22) Filed: Nov. 19, 1998

(30) Foreign Application Priority Data

Nov. 20, 1997 (JP) .............................. 9-319933

(51) Int. Cl.[7] .............................. H04B 10/00
(52) U.S. Cl. .................. 359/159; 359/110; 359/152; 359/172
(58) Field of Search ..................... 359/159, 155, 359/143, 144, 152, 153, 172, 110

(56) References Cited

U.S. PATENT DOCUMENTS

| | | | |
|---|---|---|---|
| 5,602,669 A | * | 2/1997 | Chaki .......................... 359/181 |
| 5,822,099 A | * | 10/1998 | Takamatsu .................. 359/153 |
| 6,023,359 A | * | 2/2000 | Asahi .......................... 359/119 |
| 6,025,946 A | * | 2/2000 | Miyamori et al. .......... 359/154 |
| 6,064,502 A | * | 5/2000 | Burns et al. ................. 359/152 |
| 6,233,079 B1 | * | 5/2001 | Miyamori .................... 359/180 |

FOREIGN PATENT DOCUMENTS

| | | |
|---|---|---|
| JP | 61-93056 | 6/1986 |
| JP | 62-241444 | 10/1987 |
| JP | 2-280544 | 11/1990 |
| JP | 2-280545 | 11/1990 |
| JP | 4-113799 | 4/1992 |
| JP | 6-326668 | 11/1994 |
| JP | 8-8837 | 1/1996 |
| JP | 8-8838 | 1/1996 |
| JP | 8-163036 | 6/1996 |
| JP | 8-213954 | 8/1996 |

OTHER PUBLICATIONS

Japanese Office Action issued Dec. 14, 1999 in a related application with English translation of relevant portions.

* cited by examiner

Primary Examiner—Leslie Pascal
Assistant Examiner—Hanh Phan
(74) Attorney, Agent, or Firm—Dickstein, Shapiro, Morin & Oshinsky LLP

(57) ABSTRACT

In a disclosed infrared communicator, in order to receive infrared rays transmitted from a communication-end infrared communicator without being influenced by an obstacle, a plurality of light receiving elements are provided, a light receiving element is selected which is not influenced by the obstacle existing in a space between the infrared communicator and the communication-end infrared communicator and interrupting or reflecting the infrared rays, and the infrared rays transmitted from the communication-end infrared communicator are received.

6 Claims, 8 Drawing Sheets

TABLE I

|  | RESULT A | RESULT B | RESULT C |
|---|---|---|---|
| CONVERTED VALUE 33 > CONVERTED VALUE 38 | HIGH | LOW | LOW |
| CONVERTED VALUE 33 = CONVERTED VALUE 38 | LOW | HIGH | LOW |
| CONVERTED VALUE 33 < CONVERTED VALUE 38 | LOW | LOW | HIGH |

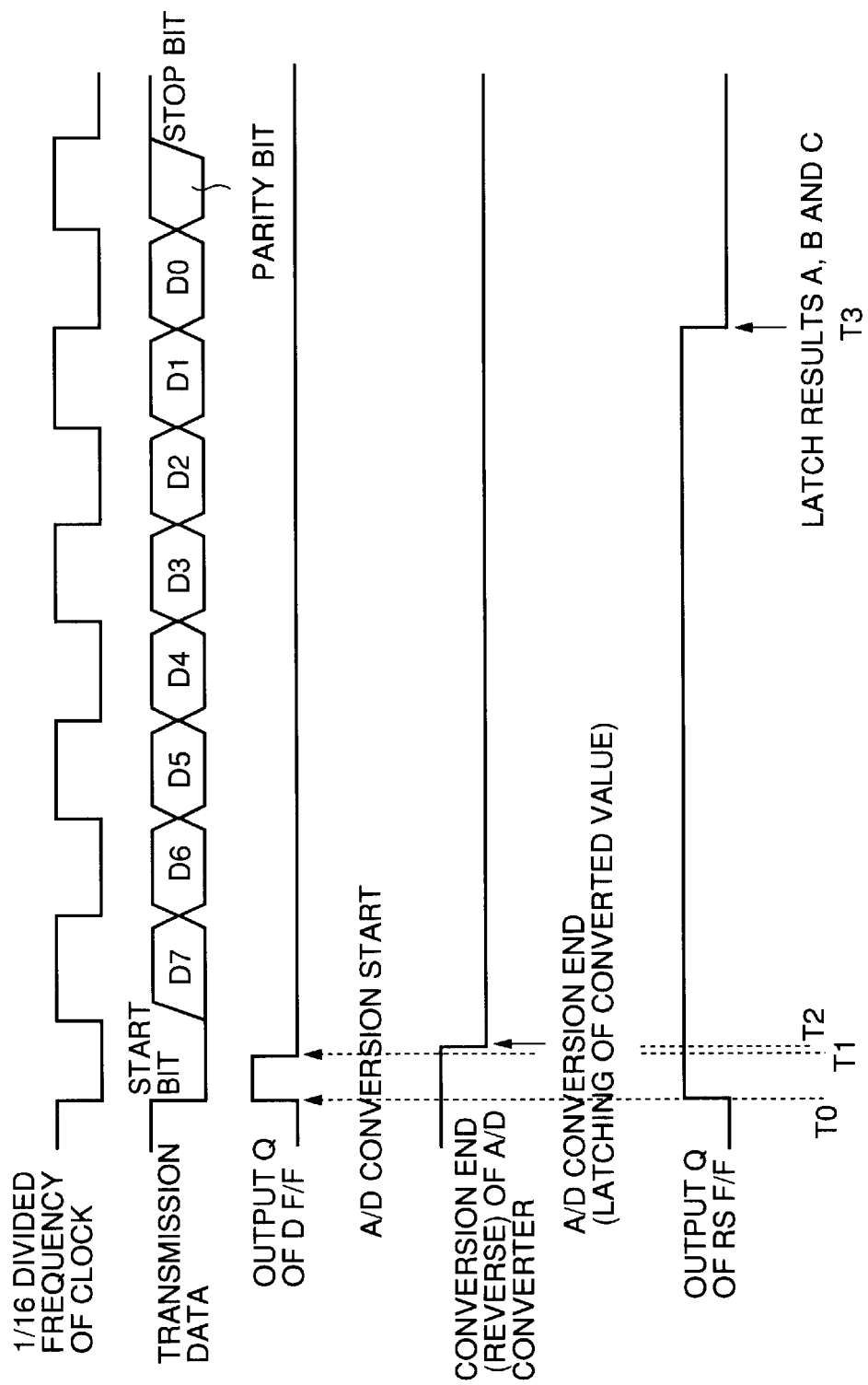

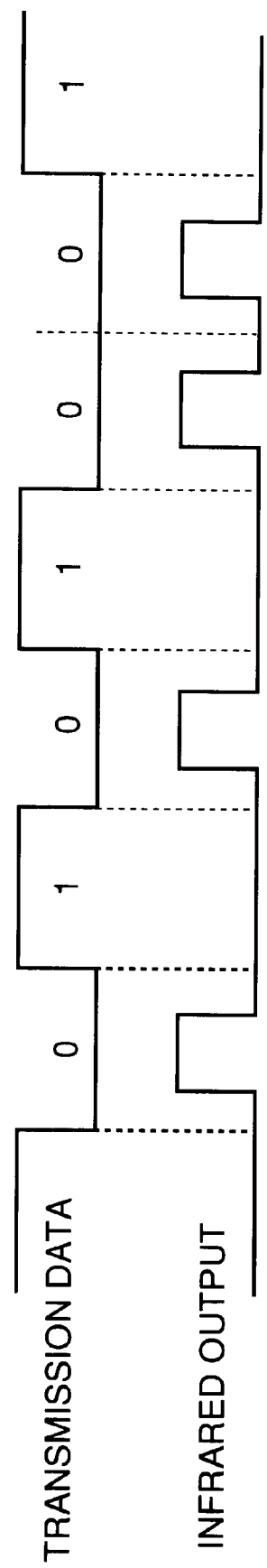

INFRARED COMMUNICATOR

BACKGROUND OF THE INVENTION

1. Field of the Invention

The present invention relates to an infrared (IR) communicator, particularly to an infrared communication device which can receive data from an IR data source without being influenced by the existence of any obstacle interrupting infrared rays between the communication device and the data source.

2. Description of the Prior Arts

A conventional infrared receiver, generally uses a single light receiving element to receive infrared rays with strong directivity radiated from multiple directions. As in an infrared communication device disclosed for example in Japanese Patent Application Laid-open No. 241444/1987, a base material for guiding infrared rays to the single light receiving element by changing the path of incident infrared rays by reflection and refraction is arranged in the periphery of the light receiving element provided in the infrared receiver. In such an infrared receiver, the infrared rays incident upon the base material advance inside therein while being reflected or refracted, so that the infrared rays are guided to the light receiving element and received.

Such conventional infrared sensor will be described with reference to FIGS. 1 and 2.

Referring first to FIG. 1, when an infrared transmitter 6 transmits an infrared ray to an infrared receiver 3, the infrared ray reaches a base material 4, which is the single base material provided in the infrared receiver 3. The infrared ray transmitted from the infrared transmitter 6 is partly reflected by the surface of the base material 4, but the remaining part of the infrared ray enters the base material 4. A part of the infrared ray incident upon the base material 4 is repeatedly reflected inside the base material 4, guided to and received by an infrared receiving section 5, which is the single receiving section provided in the infrared receiver 3.

The infrared ray transmitted from the infrared transmitter 6 is partly reflected by the surface of the base material 4, but remaining part of the infrared ray enters the base material 4. A part of the infrared ray incident upon the base material 4 is repeatedly reflected inside the base material 4, guided to and received by an infrared receiving section 5, which is the single receiving section provided in the infrared receiver 3.

Next, referring to FIG. 2, when infrared rays are transmitted from infrared transmitters 10 to an infrared receiver, 7, the infrared rays reach a base material 8 having a transparent convex lens shape, which is the single base material provided in the infrared receiver 7. Some of the infrared rays are reflected by the surface of the base material 8, but others enter the base material 8. Some of the infrared rays entering the base material 8 are refracted inside the base material 8 having the convex lens shape, further repeatedly reflected by the inner face of the base material 8, and guided to and received by an infrared receiving section 9 which is the single light receiving section of the infrared receiver 7.

The first problem with such infrared communication lies in that in the existence of an obstacle interrupting the infrared ray in space on a straight line connecting one light emitting element and one light receiving element, the infrared ray transmitted from one light emitting element cannot be received by the single light receiving element.

This is because the infrared ray transmitted from the single light emitting element and having a strong directivity is interrupted by the obstacle, so that it cannot reach the light receiving element.

The second problem lies in that even in a structure in which the light receiving element can receive infrared rays transmitted from multiple directions, if there is an obstacle interrupting the infrared rays in the space on the straight line connecting a light emitting element and a light receiving element, the infrared rays transmitted from the light emitting element cannot be received by the light receiving element.

Since the infrared ray having a strong directivity is interrupted by the obstacle before reaching the light receiving element, the infrared ray cannot be received even in the structure where the light receiving element can receive infrared rays reaching from multiple directions.

SUMMARY OF THE INVENTION

An object of the present invention is to provide an infrared receiver system which can receive infrared rays transmitted from an infrared communicator on a communication end without being influenced by obstacles in infrared communication.

Another object of the present invention is to provide an infrared communication which is not influenced by obstacles without using any special infrared communication procedure.

To attain these and other objects, the present invention provides an infrared communicator in which a light receiving element is selected which is not influenced by obstacles existing in a space between the infrared receiver system and a communication-end infrared communicator and interrupting or reflecting infrared rays, to receive the infrared rays transmitted from the communication-end infrared communicator.

Specifically, in case where the infrared transmitter of the present invention transmits an infrared ray to a communication-end infrared receiver system, the infrared receiver system of the present invention, comprises means for measuring an intensity with which the infrared ray transmitted from a light emitting element of the infrared communicator is reflected by an obstacle interrupting the infrared ray in a space between the infrared transmitter and the communication-end infrared communicator and returns to a light receiving element of the infrared communicator; means for judging which light receiving element is influenced by the interruption of the infrared ray by the obstacle; and means for selecting the light receiving element not influenced by the interruption and a reception amplifier to be connected to a demodulation circuit.

Moreover, the present invention has a characteristic that the conventional infrared communication procedure is not changed. In the measurement of the intensity with which the infrared ray is reflected by the obstacle interrupting the infrared ray in the space between the infrared communicator of the present invention and the communication-end infrared communicator and returns to the light receiving element, the infrared communicator includes means for performing the measurement in parallel with data transmission from the infrared communicator.

During the data transmission from the infrared communicator of the present invention to the communication-end infrared communicator, the light receiving element is selected which is not influenced by the obstacle existing in the space between the infrared communicator and the communication-end infrared communicator and interrupting the infrared ray. Therefore, the conventional infrared communication procedure does not need to be changed.

BRIEF DESCRIPTION OF THE DRAWINGS

FIG. 7 is a timing chart showing the operation of a transmission/reception section in the embodiment shown in FIG. 3.

FIG. 8 shows transmission data and infrared output in the embodiment shown in FIG. 3.

DETAILED DESCRIPTION OF THE PREFERRED EMBODIMENTS

The present invention will now be described with reference to the accompanying drawings.

Figure 1:
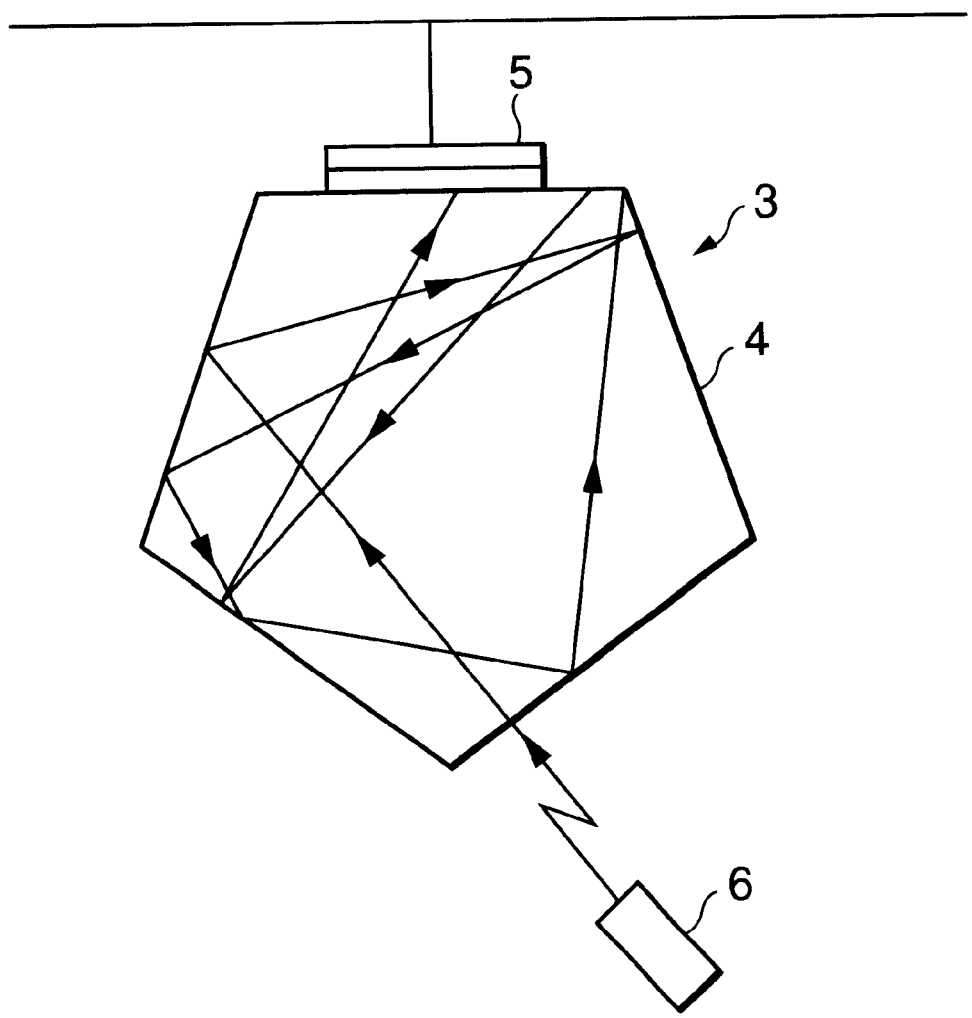
FIG. 1 is a schematic diagram showing an example of an infrared communicator according to a prior-art.
Figure 2:
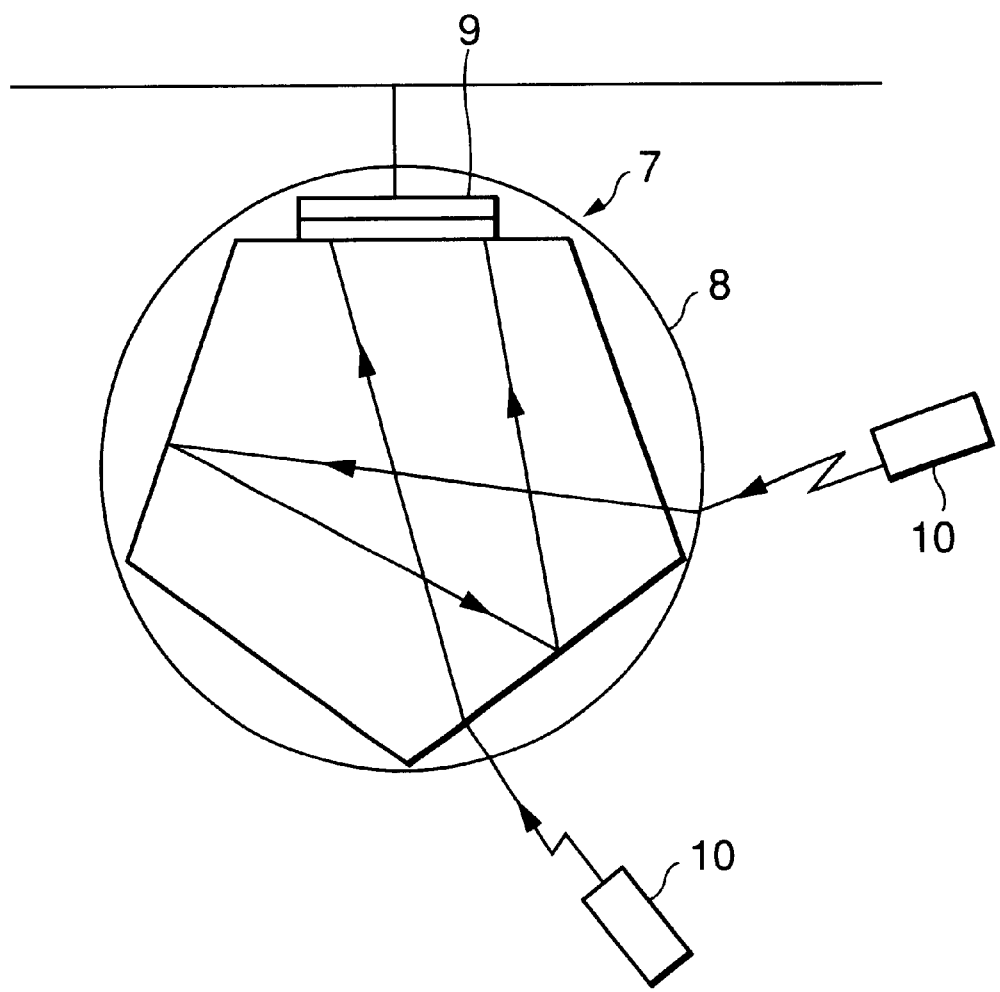
FIG. 2 is a schematic diagram showing another example of an infrared communicator according to prior-art.
Figure 3:
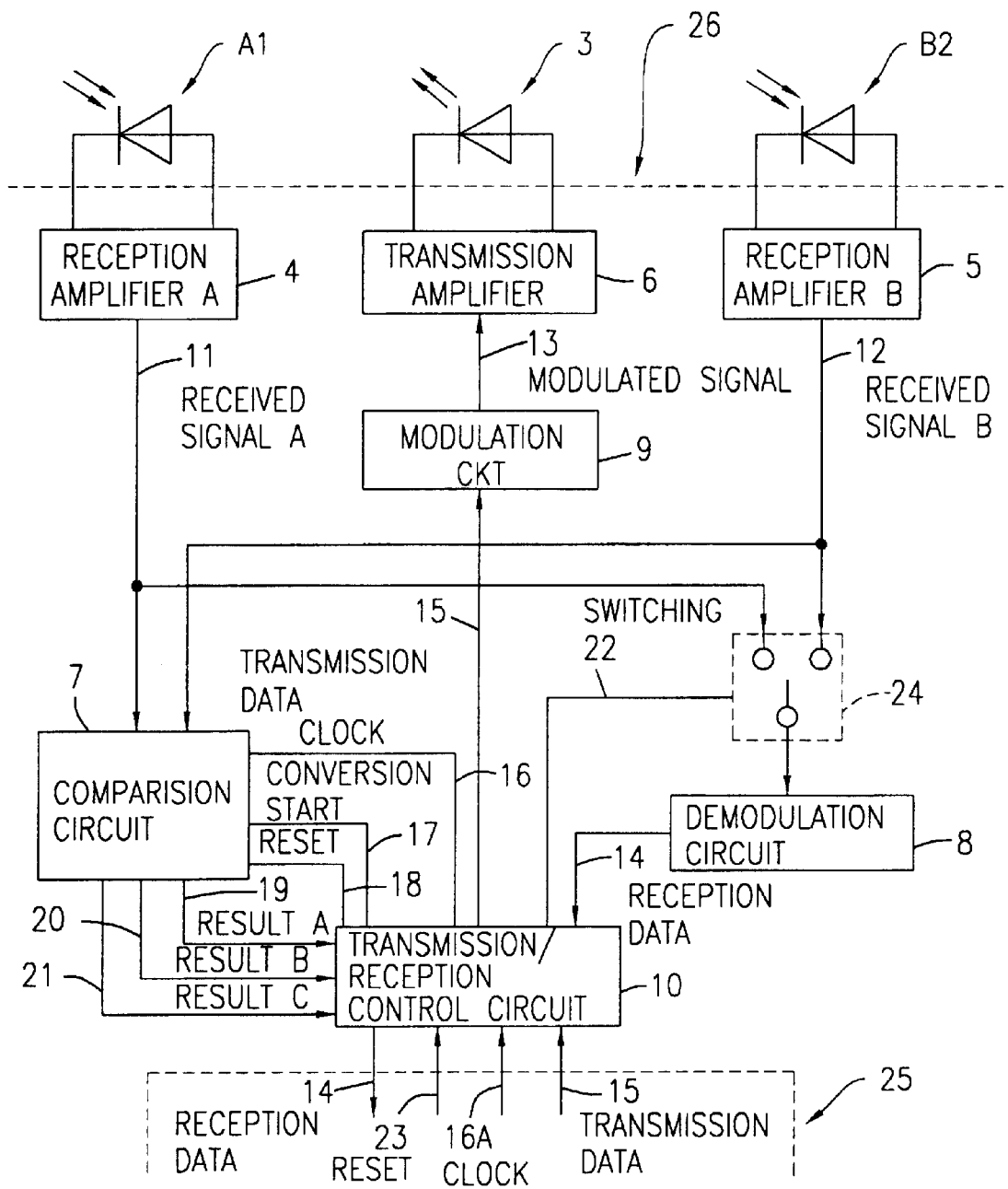
FIG. 3 is a block diagram of an infrared communicator according to an embodiment of the present invention.

Referring to FIG. 3, an infrared communication unit includes a communication stage or communicator 26 and a unit controller 25. Communicator 26 comprises a light receiving element 1 and a light receiving element 2 for receiving infrared rays transmitted from a light emitting element in another infrared communication system of compatible design. Receiving element 2 converts the infrared rays to electric signals. A reception amplifier 4 amplifies the electric signal generated in the light receiving element 1 and provides a received signal A on line 11 which can be demodulated in a demodulation circuit 8 as described below. A second reception amplifier 5 amplifies the electric signal generated in the light receiving element 2 and provides a received signal B on line 12 which can also be demodulated in the demodulation circuit 8.

A comparison circuit 7 controlled by a transmission/reception control circuit 10 which provides a clock 16, a conversion start signal 17 and a reset signal 18. Comparison circuit 7 measures the voltages of the received signals A and B and provides comparison result signals A, B, C to transmission/reception control circuit 10 on lines 19, 20 and 21 respectively.

A switch 24 selects either received signal A or B for delivery to the demodulation circuit 8 according to switching control signal on line 22 from transmission/reception control circuit 10. The control signal is generated from comparison result signals A, B and C as described below.

A modulation circuit 9 modulates transmission data on line 15 to provide a modulated signal on line 13. A transmission amplifier 6 couples the modulated signal to a light emitting element 3 which emits an infrared signal for communication to another compatible system.

Transmission/reception control circuit 10 receives a reset signal on line 23, the clock signal on line 16A and a transmission data 15 from signal on line 15 unit controller 25. Reception data from demodulation circuit 8 is provided over line 14 to the unit controller 25.

Figure 4A:
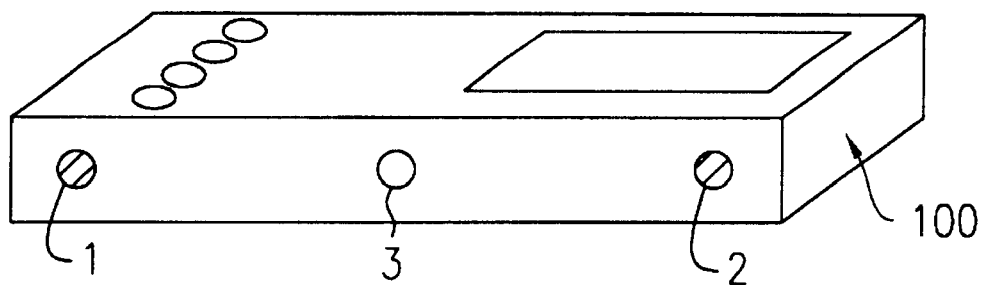
FIGS. 4A and 4B are schematic diagrams showing the mounting positions of light receiving and emitting elements according to the embodiment shown in FIG. 3.
Figure 4B:
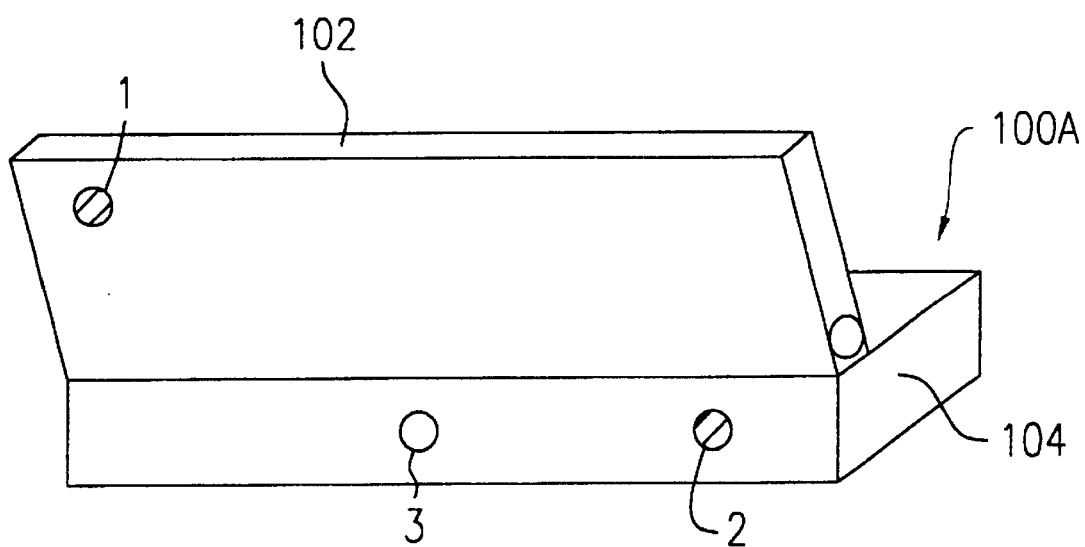

As shown in FIG. 4A, the light receiving element 1, the light emitting element 3 and the light receiving element 2 of infrared communicator 26 are arranged in a row on the side face of a communication unit 100. As shown in FIG. 4B, the light receiving element A1 may be attached to a lid 102 of a communication unit 100A, while the light receiving element 2 and the light emitting element 3 are arranged in a row on the side face of body of the communication unit. As will be apparent to one skilled in the art, the configuration shown in FIG. 4B allows the separation of receiving elements 1 and 2 to be substantially maximized.

The comparison circuit 7 will now be described in detail with reference to FIG. 5.

Figure 5:
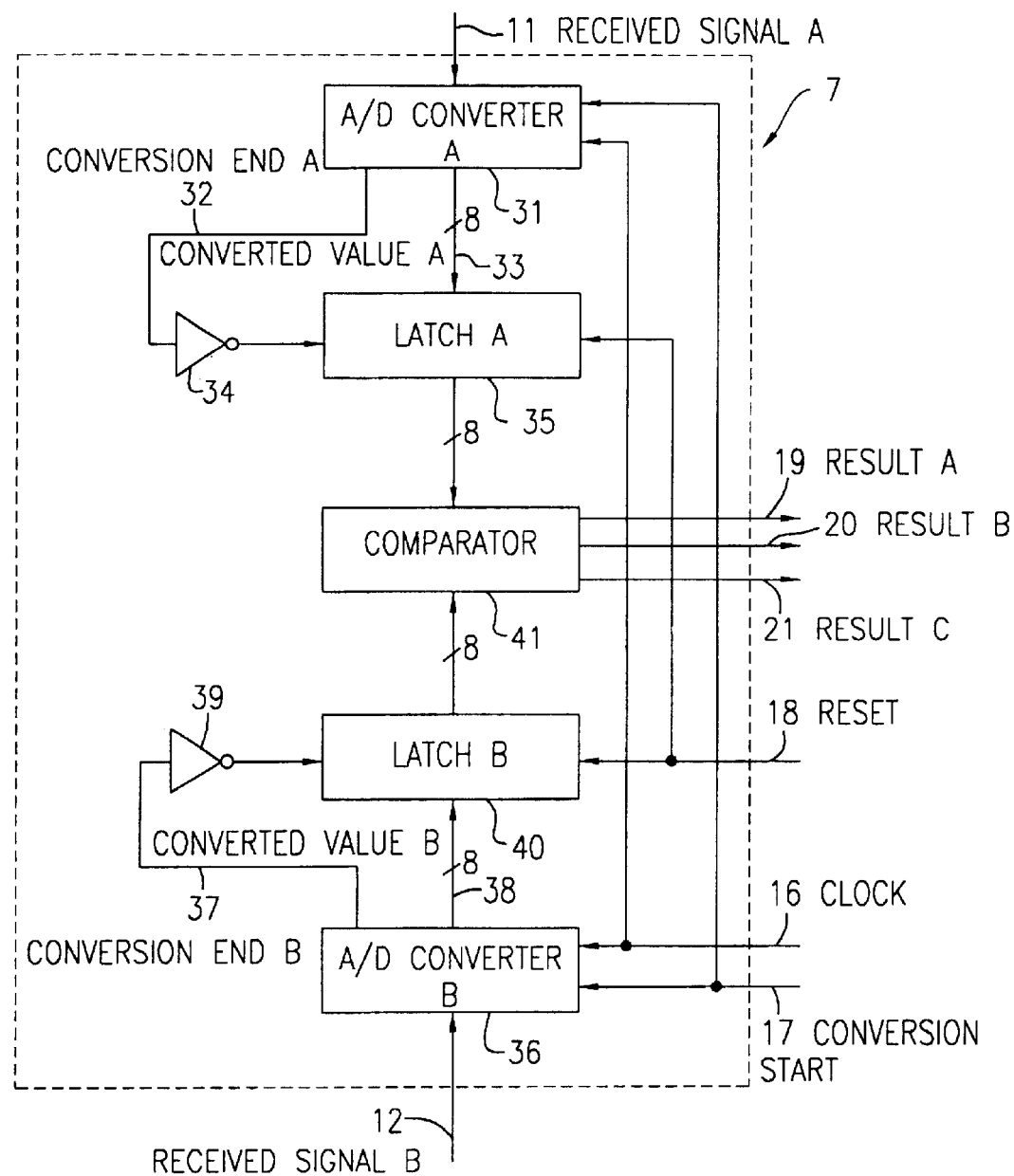
FIG. 5 is a block diagram of a comparison circuit in the embodiment shown in FIG. 3.

Referring to FIG. 5, comparison circuit 7 is comprised of first and second A/D converters 31 and 36, first and second latch circuits 35 and 40, first and inverters 34 and 39, and a comparator 41. Input signals for A/D converters 31 and 36 are provided by received signals A and B on lines 11 and 12, respectively. Operation of A/D converters 31 and 36 is triggered by a conversion start signal provided over line 17 from transmission/reception control circuit 10 to provide digitized eight-bit outputs on buses 33 and 38, respectively. Timing for the A/D converters is provided by the clock signals on line 16 from transmission/reception control circuit 10.

Latch circuits 35 and 40 are connected to the outputs of A/D converters 31 and 36 respectively, and store the digitized received signals when triggered by conversion end signals provided by the A/D circuits on lines 32 and 37 through respective inverters 34 and 39. Reset signals for latch Circuits 35 and 40 are provided on line 18 from transmission/reception control circuit 10.

The data stored in latch circuits 35 and 40 is provided to comparator 41. Table I shows the values for the Result Signals A, B, and C provided by comparator 41 in relation to the values of the digitized input signals from receivers 1 and 2 as stored by latch circuits 35 and 40.

The transmission/reception control circuit 10 will be described with reference to FIG. 6.

Figure 6:
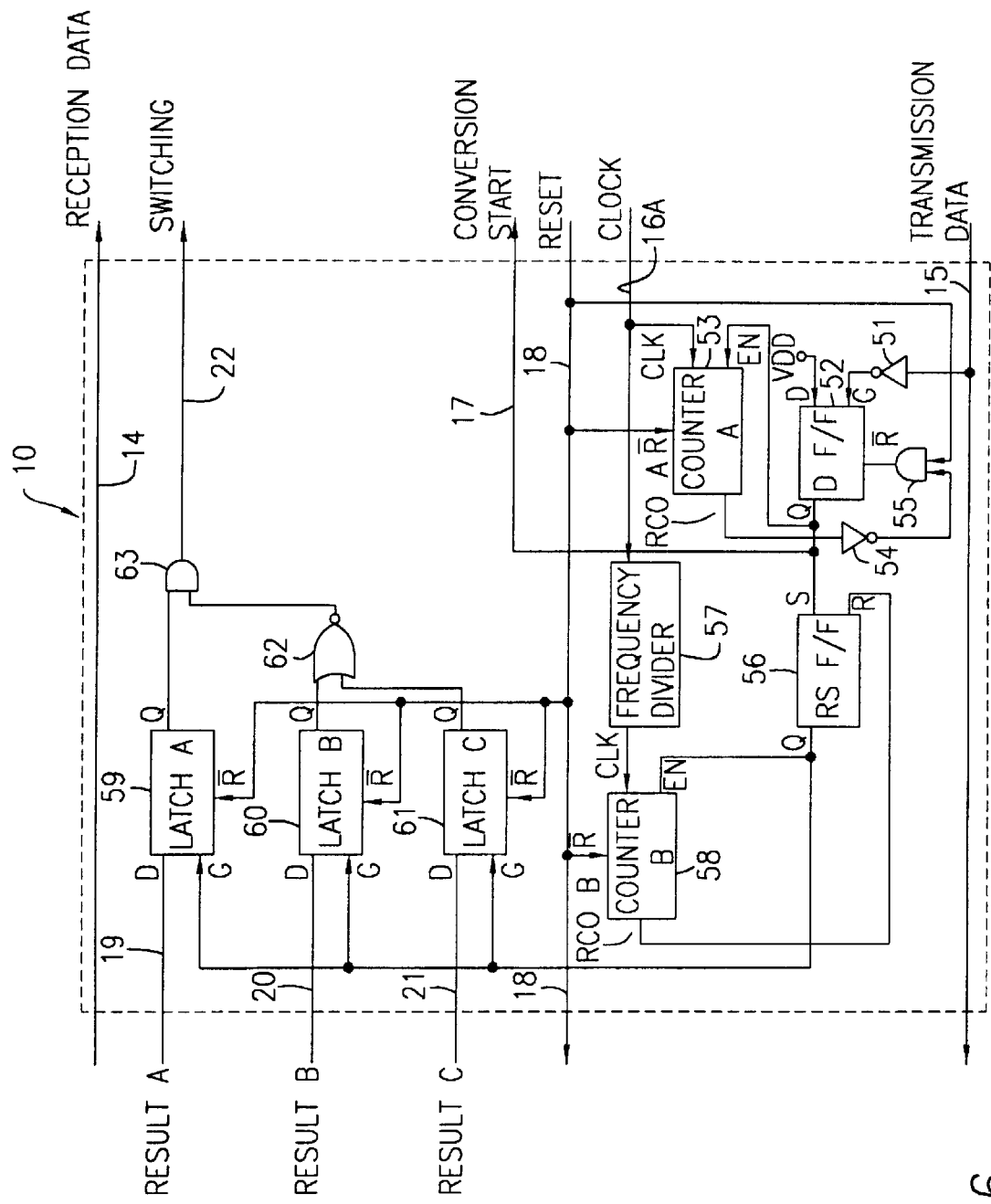
FIG. 6 is a block diagram of a transmission/reception control circuit in the embodiment shown in FIG. 3.

Referring to FIG. 6, the transmission reception control circuit 10 comprises a flip-flop 52 which receives transmission data on line 15 from unit controller 25 through an inverter 51. Flip-flop 52 responds to the falling of the start bit of the transmission data to generate the conversion start signal on line 17 for A/D converters 31 and 36 (see FIG. 5.)

Transmission/reception control circuit 10 further comprises a first counter 53 which provides an output RCOA for every eight clock signals on line 16A from unit controller 25. The RCOA signal is connected through an inverter 54 as one in put to an AND gate 55. A second input for AND gate 55 is provided by a reset signal on line 18 from unit controller 25. The output of D flip-flop 52 also provides an enable signal EN for counter 53.

Three latch circuits 59, 60, and 61 respectively receive and retain the A, B, and C Result signals on lines 19, 20, and 21 from comparator 41 (see FIG. 5). An RS flip-flop 56 provides gating signals for latches 59, 60, and 61. A NOR gate 62 receives the outputs of latch circuits 60 and 61, and provides an output to an AND gate 63. A second input to AND gate 63 is provided by an output of latch circuit 59. The output of AND gate 63 provides the switching control signal on line 22 for received signal selection switch 24 (see FIG. 3).

A frequency divider 57 which divides the clock signal on line 16A by 16 is connected to a second counter 58 which provides an output RCOB for every eight outputs from the frequency divider. The RCOB signal serves as a reset for RS flip-flop 56. The output of RS flip-flop 56 also provides an enable input EN for counter 58. A Reset input for counter 58, and also for counter 53, is provided by the Reset signal on line 18 from unit controller 25.

The transmission data on line 15 is transmitted from the unit controller 25 to the transmission/reception control circuit 10, for example, from a serial output port using asynchronous serial communication. The demodulated reception data from the selected IR receiver on line 14 is transmitted from the transmission/reception control circuit 10 to the unit controller 25, for example, from a serial input port using asynchronous serial communication. The clock signal on line 16A transmitted from the unit controller 25 to the transmission/reception control circuit 10 is the same as that for use in driving A/D converters 31 and 36 (see FIG. 5). The reset signal on line 18 transmitted from the unit controller 25 to the transmission/reception control circuit 10 corresponds, for example, to one bit of a circuit which can be optionally controlled by the unit controller 25, e.g. a parallel output port.

The operation of the embodiment will now be described with reference to the drawings.

Referring to FIG. 3, when transmission is performed from the infrared communicator 26 to a compatible remote unit, the transmission data on line 15 is transmitted from the unit controller 25 to the transmission/reception control circuit 10, and then to the modulation circuit 9. The transmission data is suitably modulated and outputted onto line 13 to and is then transmitted to the remote unit as an infrared ray by the transmission amplifier 6 and the light emitting element 3.

FIG. 7 is a timing chart showing the operation of the transmission/reception control circuit, and FIG. 8 shows the transmission data and the infrared ray output.

Referring to FIG. 7, the start bit is attached to the one-byte beginning of the transmission data. Referring to FIG. 8, for the relationship of output between the transmission data and the infrared ray, the infrared ray is transmitted when the transmission data is zero, and no infrared ray is transmitted when the transmission data is one. Since the start bit attached to the beginning of the transmission data is zero, the infrared ray is sure to be transmitted at the beginning of the transmission data. To measure the intensity of the infrared ray transmitted from the light emitting element and reflected by the obstacle, the reflection of the start bit at the time of data transmission needs to be measured.

Referring to FIG. 6, when D flip-flop 52 detects the falling of the start bit of the transmission data 15 via the inverter 51, output Q of D flip-flop 52 changes from low to high, and the counter A53 starts counting the clock pulses on line 16A. This corresponds to output Q of D F/F (D flip-flop) at A/D conversion start T0 in the timing chart of FIG. 7.

Referring to FIG. 6, when the counter A53 finishes counting eight times, RCO of the counter A53 changes from low to high, D flip-flop 52 is reset via the inverter 54 and AND 55, and output Q of D flip-flop 52 changes from high to low. The output Q of D flip-flop 52 is transmitted to the A/D converter A31 and A/D converter B36 built in the comparison circuit 7 of FIG. 5 as the conversion start signal on line 17. This corresponds to the output Q of D F/F at T1 in the timing chart of FIG. 7.

Referring to FIG. 5, when the conversion start signal on line 17 changes from low to high, A/D converter 21 converts the voltage of the received A signal on line 11, A/D converter 36 converts the voltage of the received B signal on line 12, and A/D converter 21 transmits the A converted value on line 33 and the A conversion end signal on line 32 to the A latch 35 upon completion of conversion. When the reversed output of the A conversion end signal on line 32 obtained by the inverter 34 changes from high to low, the A latch 35 latches the converted A value on line 33. When the conversion start signal on line 17 changes from low to high, A/D converter 36 transmits the converted B value on line 38 and the B conversion end signal on line 37 to the B latch 40 upon completion of conversion. When the reversed output of the B conversion end signal on line 37 obtained by the inverter 39 changes from high to low, the B latch 40 latches the converted B value on line 38. This corresponds to A/D conversion end T2 of A/D converter conversion end (reverse) in the timing chart of FIG. 7.

Referring to FIG. 5, the comparator 41 compares the converted A value on line 33 latched by the A latch 35 and the converted B value on line 38 latched by the B latch 40, and transmits comparison results to lines 19, 20 and 21 as shown in Table I. For example, when the converted A value on line 33 is greater than the converted B value on line 38 and the A result on line 19 is high, it follows that the light receiving element 1 receives the reflected light with a higher output than the light receiving element 2. This indicates that the light receiving element 1 is closer to the obstacle.

For RS flip-flop 56 of FIG. 6, when the output Q of D flip-flop 52 changes from low to high, the output Q of RS flip-flop 56 changes from low to high, and the counter B58 starts counting one-sixteenth frequency output of the clock 16 prepared by the frequency divider 57. After counting is performed eight times, RCO is changed from low to high.

When RCO of the counter B58 changes from low to high, the output Q of RS flip-flop 56 changes from high to low, and the counter B58 stops counting. The output Q of RS flip-flop 56 is shown as the output Q of RS F/F in the timing chart of FIG. 7. For D latches 59, 60 and 61 of FIG. 6, when the output Q of RS flip-flop 56 changes from high to low, D latches 59, 60 and 61 latch the values of A, B and C results respectively. The latching timing is shown in D F/F timing chart of FIG. 7. This corresponds to T3 at which results A, B and C are latched in RS F/F timing chart of FIG. 7.

Referring to FIG. 6, D latches 59, 60 and 61 latch the values of A, B and C result signals. The D latch 60 transmits result signal B on line 20 to NOR 62, D latch 61 transmits result signal C on line 21 to NOR 62, and D latch 59 transmits result signal A on line 19 to AND 63. The NOR 62 transmits the reverse of logical sum of results B and C to AND 63, and AND 63 emits the logical product of outputs of D latch 59 and NOR 62 as the switching 22.

Referring to FIG. 3, the switching signal on line 22 is transmitted to the switch 24. When the switching signal is high, the switch 24 connects the B reception amplifier 5 and the demodulation a circuit 8. When the switching 22 is low, the A reception amplifier 4 and the demodulation circuit 8 are connected. Referring to FIG. 7, the A, B and C result signals are defined and the light receiving element influenced by the obstacle by which the infrared ray is interrupted is detected until the transmission of one byte of transmission data is completed. Therefore, the switching signal is defined, and the switch 24 is switched.

Additionally, two light receiving elements are provided in the embodiment, but the present invention is not limited to the embodiment, and a plurality of light receiving elements may be provided. Moreover, instead of providing each light receiving element with the reception amplifier, one common reception amplifier may be provided for a plurality of light receiving elements.

The first effect is that in the infrared communication between the infrared communicator of the present invention and the communication-end infrared communicator, the infrared communication can be performed without being influenced by the interruption of the obstacle which exists in the space between the infrared communicator of the present invention and the communication-end infrared communicator.

This is because the light receiving element is selected which is not influenced by the obstacle which exists in the space between the infrared communicator of the present invention and the communication-end infrared communicator to interrupt the infrared ray, so that the infrared ray is received by the light receiving element not influenced by the obstacle.

The second effect is that the infrared communication between the infrared communicator of the present invention and the communication-end infrared communicator is performed in the conventional infrared communication procedure, and no special communication procedure needs to be used.

This is because during data transmission from the infrared communicator of the present invention to the communication-end infrared communicator, the intensity of the reflected wave from the obstacle existing in the space between the infrared communicator of the present invention and the communication-end infrared communicator, and the light receiving element not influenced by the obstacle is selected.

What is claimed is:

1. A two-way communication device comprising:
    an infrared transmitting element;
    a plurality of infrared receiving elements;
    a first processing circuit responsive to data to be transmitted by the communication device to provide an outgoing data signal to said infrared transmitting element;
    a second processing circuit responsive to data received from a remote data source;
    a first control circuit operative to generate a control signal at a predetermined time relative to transmission of an outgoing signal by the infrared transmitting element;
    a comparison circuit, the comparison circuit being comprised of:
    a plurality of third processing circuits respectively connected to the infrared receiving elements, each of the third processing circuits being operative simultaneously in response to the control signal to generate outputs representative of the intensity of signal received by one of the receiving elements at the predetermined time;
       a fourth processing circuit operative to identify from the outputs of the third processing circuits, the receiving element having the lowest received IR intensity at the predetermined time relative to transmission of the signal by the infrared transmitting element; and
       a selection device responsive to an output of the third processing circuit to connect the identified receiving element to the second processing circuit for reception of data transmitted by the remote data source.

2. The communication device as described in claim 1, wherein the first control circuit and the fourth processing circuit are included in the controller.

3. The communication device is described in claim 1, wherein each of the third processing circuits is comprised of:
    an A/D converter having an input coupled to one of the receiving elements, the A/D converter being operative in response to the control signal to convert the output of the connected receiving element into a digital signal in parallel form;
    a latch circuit connected to receive a parallel output from the A/D converter; and
    a driver circuit responsive to a conversion end signal from the A/D converter to trigger the latch circuit.

4. The communication device as described in claim 3 wherein:
    the comparison circuit is further comprised of a first logic circuit responsive to the outputs of the latch circuits to generate output signals representative of the relative intensities of signals received by the receiving elements at the predetermined time;
    the fourth processing circuit is comprised of a second logic circuit responsive to the output signals from the first logic circuit to identify the receiving element having the lowest received IR intensity at the predetermined time; and
    the selection device comprises a switch having signal inputs connected to the receiving elements, a signal output connected to the second processing circuit and a control input connected to an output of the fourth processing circuit.

5. The communication device as described in claim 4, further including a housing that supports the transmitting element, the plurality of receiving elements, the first and second processing circuits, and the transmission/reception controller, the receiving elements being so positioned on the housing that the separation between them is substantially maximized.

6. A communication device as described in claim 4, further including a housing that supports the transmitting element, the first and second receiving elements, the first and second processing circuits, and the transmission/reception controller, the housing being comprised of:
    a body portion; and
    a captive movable cover for the body portion,
    a first receiving element being located on the body portion and a second receiving element being located on the cover portion, and so positioned that the separation between them is substantially maximized.

* * * * *